US008830164B2

(12) United States Patent
Sakata et al.

(10) Patent No.: US 8,830,164 B2
(45) Date of Patent: Sep. 9, 2014

(54) USER INTERFACE DEVICE AND INPUT METHOD

(75) Inventors: Kotaro Sakata, Hyogo (JP); Shigenori Maeda, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 473 days.

(21) Appl. No.: 13/147,246

(22) PCT Filed: Dec. 2, 2010

(86) PCT No.: PCT/JP2010/007026
§ 371 (c)(1),
(2), (4) Date: Aug. 25, 2011

(87) PCT Pub. No.: WO2011/074198
PCT Pub. Date: Jun. 23, 2011

(65) Prior Publication Data
US 2011/0298702 A1    Dec. 8, 2011

(30) Foreign Application Priority Data

Dec. 14, 2009  (JP) ................. 2009-282491

(51) Int. Cl.
*G09G 5/00* (2006.01)
*G06T 7/00* (2006.01)
*G06F 3/01* (2006.01)
(52) U.S. Cl.
CPC .............. *G06F 3/013* (2013.01); *G06T 7/0044* (2013.01); *G06T 2207/30201* (2013.01); *G06T 2207/10021* (2013.01); *G06T 2207/10016* (2013.01); *G06T 2207/10024* (2013.01)
USPC ................... 345/156; 345/7; 345/8; 359/630

(58) Field of Classification Search
CPC .. G02B 27/0101; G02B 27/01; G02B 27/017; G02B 27/0172; G02B 2027/0132; H04N 13/0497; H04N 3/003
USPC .................. 345/7–9, 156–158; 359/629–630
See application file for complete search history.

(56) References Cited

U.S. PATENT DOCUMENTS 7,130,461 B2   10/2006  Rosenholtz
7,212,683 B2    5/2007  Dolan et al.
(Continued)

FOREIGN PATENT DOCUMENTS

JP           9-190325        7/1997
JP         2004-199695       7/2004
(Continued)

OTHER PUBLICATIONS

International Search Report issued Jan. 18, 2011 in International (PCT) Application No. PCT/JP2010/007026.

(Continued)

*Primary Examiner* — Kimnhung Nguyen
(74) *Attorney, Agent, or Firm* — Wenderoth, Lind & Ponack, L.L.P.

(57) ABSTRACT

A user interface device estimates a user's degree of interest, for performing an input process on the basis of the user's degree of interest in a plurality of objects displayed on a screen. The device includes a gaze direction detection unit that detects a gaze direction of the user; a gaze duration calculation unit that calculates gaze duration during which the gaze direction has remained on each of the plurality of objects; an eye-attracting force calculation unit that calculates eye-attracting force of each of the plurality of objects; and a degree of interest estimation unit that estimates the user's degree of interest in each of the plurality of objects, such that the longer the gaze duration is the higher the degree of interest becomes, and that the smaller the eye-attracting force is the higher the degree of interest becomes.

21 Claims, 12 Drawing Sheets

(56) References Cited

U.S. PATENT DOCUMENTS

| | | |
|---|---|---|
| 7,212,684 B2 | 5/2007 | Dolan et al. |
| 7,218,778 B2 | 5/2007 | Dolan et al. |
| 7,260,276 B2 | 8/2007 | Dolan et al. |
| 7,266,242 B2 | 9/2007 | Dolan et al. |
| 7,266,243 B2 | 9/2007 | Dolan et al. |
| 7,266,252 B2 | 9/2007 | Dolan et al. |
| 7,266,253 B2 | 9/2007 | Dolan et al. |
| 7,292,736 B2 | 11/2007 | Dolan et al. |
| 7,834,912 B2 | 11/2010 | Yoshinaga et al. |
| 7,840,069 B2 | 11/2010 | Dolan et al. |
| 2004/0120574 A1 | 6/2004 | Rosenholtz |
| 2005/0047629 A1* | 3/2005 | Farrell et al. ............... 382/117 |
| 2006/0002616 A1 | 1/2006 | Dolan et al. |
| 2006/0002617 A1 | 1/2006 | Dolan et al. |
| 2006/0002618 A1 | 1/2006 | Dolan et al. |
| 2006/0002619 A1 | 1/2006 | Dolan et al. |
| 2006/0002620 A1 | 1/2006 | Dolan et al. |
| 2006/0002621 A1 | 1/2006 | Dolan et al. |
| 2006/0002622 A1 | 1/2006 | Dolan et al. |
| 2006/0002623 A1 | 1/2006 | Dolan et al. |
| 2006/0002627 A1 | 1/2006 | Dolan et al. |
| 2006/0002628 A1 | 1/2006 | Dolan et al. |
| 2006/0215261 A1* | 9/2006 | Sato ........................... 359/464 |
| 2007/0164990 A1 | 7/2007 | Bjorklund et al. |
| 2007/0201749 A1 | 8/2007 | Yamauchi et al. |
| 2007/0247524 A1 | 10/2007 | Yoshinaga et al. |
| 2008/0002262 A1* | 1/2008 | Chirieleison ............... 359/630 |
| 2009/0060267 A1 | 3/2009 | Gu et al. |
| 2010/0156781 A1* | 6/2010 | Fahn ........................... 345/156 |
| 2010/0231504 A1* | 9/2010 | Bloem et al. ............... 345/156 |
| 2011/0050656 A1 | 3/2011 | Sakata et al. |
| 2011/0141010 A1 | 6/2011 | Sakata et al. |

FOREIGN PATENT DOCUMENTS

| | | |
|---|---|---|
| JP | 2007-18025 | 1/2007 |
| JP | 2007-286995 | 11/2007 |
| JP | 2008-502990 | 1/2008 |
| JP | 2008-112401 | 5/2008 |
| JP | 2008-141484 | 6/2008 |
| JP | 2009-193499 | 8/2009 |
| JP | 2009-245364 | 10/2009 |
| JP | 2009-535683 | 10/2009 |
| WO | 2006/082979 | 8/2006 |
| WO | 2010/070882 | 6/2010 |
| WO | 2010/143377 | 12/2010 |

OTHER PUBLICATIONS

Masanori Miyhara, Masaki Aoki, Tetsuya Takiguchi, Yasuo Ariki: "*Tagging Video Contents Based on Interest Estimation from Facial Expression*", IPSJ Journal vol. 49, No. 10, pp. 3694-3702, Oct. 2008.

Shoji Tanaka, Seiji Inokuchi, Yuichi Datadate, Ryohei Nakatsu: "*An Attractiveness Evaluation Model Based on the Physical Features of Image Regions*", IEICE Journal A, vol. J83-A, No. 5, pp. 576-588, May 2000.

B.S. Manjunath, W.Y. Ma: "*Texture Features for Browsing and Retrieval of Image Data*", IEEE Trans. Pattern Analysis and Mach. Intelligence, vol. 18, No. 8, pp. 837-842, Aug. 1996.

* cited by examiner

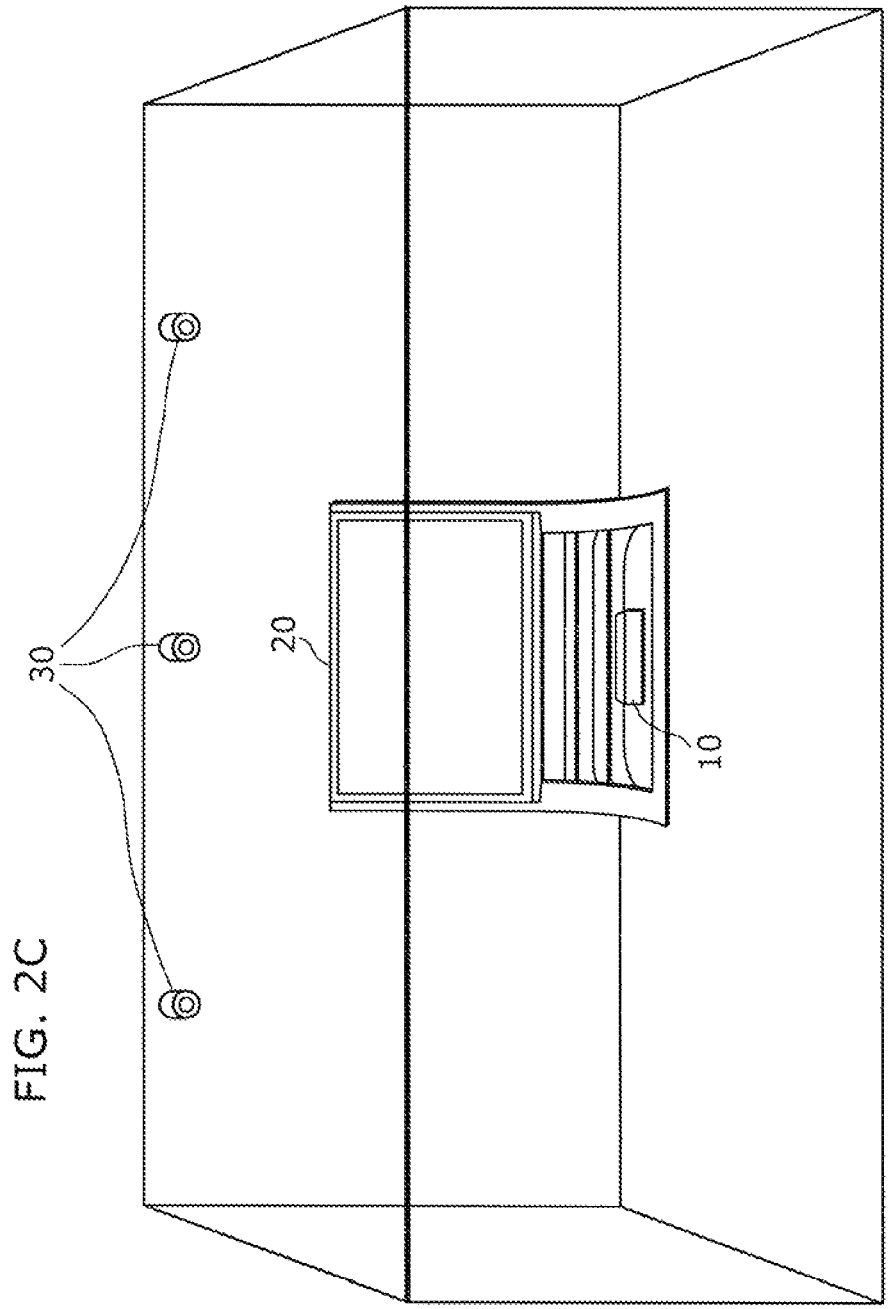

USER INTERFACE DEVICE AND INPUT METHOD

BACKGROUND OF INVENTION

1. Technical Field

The present invention relates to a user interface device that estimates a degree of interest of a user in a plurality of objects displayed on a screen for executing an input process on the basis of the degree of interest of the user, and to an input method.

2. Background Art

Currently available information systems are generally designed to perform an interaction such as presenting information to a user upon reacting to an "express request" of the user (for example, an input of a character through a keyboard, a press of a button on a remote controller, or designation of an object with a pointing device, performed by the user). Such conventional interaction mode is, however, insufficient for achieving smooth communication between the user and the system, because of difficulty and trouble in manipulation, as well as complexity of expressing an intention of the user.

Accordingly, a recently proposed system estimates an "implied request" of the user (for example, whether the user is interested, or the degree of the user's interest) utilizing a multimodal sensor group including a camera or a microphone. For example, NPL 1 proposes a system that shoots a user viewing a video content and estimates the degree of interest on the basis of the user's facial expression, to thereby add a tag such as "Neutral", "Positive", or "Negative" to the video content, thus providing information useful for recommending a program. Also, PTL 1 proposes an image reproduction system that sequentially reproduces and displays a plurality of different object images, and that dynamically determines a display time of the object image on the basis of a peripheral sound (such as a cheer of the viewer) and the viewer's action (such as a change in facial expression). These techniques are employed basically for determining the degree of interest in a single content displayed on the screen.

Meanwhile, gaze direction is one of typical physical reactions that can be used for estimating the user's interest, attention, or intention, with respect to a plurality of contents displayed on a screen. Although vision is a predominant factor when one desires to acquire information, area of central vision and an effective visual field are limited. Accordingly, it is necessary for the user to move a gaze point to an object in order to acquire information from the object. Resultantly, the gaze direction concentrates at the object in which the user is interested. The gaze direction can, therefore, be construed as generally representing the user's interest, attention, or intention.

Here, PTL 2 discloses a device that decides an object on which the user's eye remains for a long time to be the object desired by the user. The device displays a plurality of images on a screen for user's choice, and selects an image that the user desires by detecting the user's eye direction to the images with a gaze angle detector, measuring gaze duration on each of the images, and comparing the lengths of the duration.

CITATION LIST

Patent Literature

[PTL 1] Japanese Unexamined Patent Application Publication No. 2008-141484
[PTL 2] Japanese Unexamined Patent Application Publication No. H9-190325

Non Patent Literature

[NPL 1] Masanori MIYAHARA, Masaki AOKI, Tetsuya TAKIGUCHI, Yasuo ARIKI: Tagging Video Contents Based on Interest Estimation from Facial Expression, IPSJ Journal Vol. 49, No. 10, pp. 3694-3702, 2008

SUMMARY OF INVENTION

With the technique according to PTL 2, an object that has gained a longer gaze duration is decided to be the object in which the user has a higher degree of interest, and a command associated with the object of longer gaze duration is executed. However, estimating the user's degree of interest exclusively on the basis of the gaze duration may lead to degraded estimation accuracy of the degree of interest. This is because one is not always interested in what he or she is looking at, and hence the gaze duration does not always agree with his/her degree of interest.

The present invention has been conceived in view of the foregoing problem, with an object to provide a user interface device capable of estimating a user's degree of interest with high accuracy, for performing an input process on the basis of the user's degree of interest in a plurality of objects displayed on a screen, and an input method for such a device.

Accordingly, an aspect of the present invention provides a user interface device configured to estimate a user's degree of interest in a plurality of objects displayed on a screen, for performing an input process on the basis of the user's degree of interest, said user interface device comprising a gaze direction detection unit configured to detect a gaze direction of the user; a gaze duration calculation unit configured to calculate a gaze duration during which the gaze direction has remained on each of the plurality of objects; an eye-attracting force calculation unit configured to calculate an eye-attracting force of each of the plurality of objects; and a degree of interest estimation unit configured to estimate the user's degree of interest in each of the plurality of objects such that the longer the gaze duration is the higher the degree of interest becomes, and that the smaller the eye-attracting force is the higher the degree of interest becomes.

The device thus configured can estimate the user's degree of interest on the basis of the eye-attracting force of each object, in addition to the gaze duration on the object. The object having a large eye-attracting force induces the user to look at the object despite that the user is not interested in that object. Thus, the gaze duration fluctuates depending not only on the user's degree of interest in the object, but also on the eye-attracting force of the object. Accordingly, estimating the degree of interest on the basis of the eye-attracting force suppresses a portion of the gaze duration unrelated to the user's degree of interest from affecting the estimation of the degree of interest. This leads to highly accurate estimation of the user's degree of interest in the object. Also, for example, controlling the device so as to display only those objects in which the user has a higher degree of interest, on the basis of the degree of interest thus estimated, leads to reduced power consumption.

Preferably, the eye-attracting force calculation unit may be configured to calculate the eye-attracting force of each of the objects on the basis of a physical feature of an image of the object. In this case, for example, the eye-attracting force calculation unit may be configured to calculate the eye-attracting force of each of the objects on the basis of a degree of complexity of the image of the object, such that the higher the degree of complexity is the greater the eye-attracting force becomes. Also, for example, the eye-attracting force calculation unit may be configured to calculate the eye-attracting force of each of the objects on the basis of a degree of heterogeneity of the image of the object from images located around the object, such that the higher the degree of heterogeneity is the greater the eye-attracting force becomes.

The foregoing arrangements enable calculation of the eye-attracting force based on the physical feature of the object. The eye-attracting force depends on the physical feature of the object (for example, degree of complexity and degree of heterogeneity of the object). For instance, the highly complicated image of the object induces the user to keep his/her eyes longer on that object for understanding its content. Therefore, calculating the eye-attracting force on the basis of the physical feature of the object leads to accurate calculation of the eye-attracting force, thereby resulting in accurate estimation of the user's degree of interest.

It is also preferable that the eye-attracting force calculation unit is configured to calculate the eye-attracting force of each of the objects such that the shorter the psychological distance between the object and the user is the greater the eye-attracting force becomes. In this case, for example, the eye-attracting force calculation unit may be configured to calculate, for each of the objects, the psychological distance such that the greater the number of times that the user has so far viewed the object is the shorter the psychological distance becomes. Also, for example, the eye-attracting force calculation unit may be configured to calculate, for each of the objects, the psychological distance on the basis of whether the user is a producer of the object, such that the psychological distance becomes shorter in the case where the user is a producer of the object, than in the negative case. Further, for example, the eye-attracting force calculation unit may be configured to calculate, for each of the objects, the psychological distance on the basis of whether the user is a subject displayed in the object, such that the psychological distance becomes shorter in the case where the user is a subject displayed in the object, than in the negative case.

Such arrangements enable calculation of the eye-attracting force based on the psychological distance between the user and the object. The eye-attracting force depends on the psychological distance between the user and the object (for example, the number of times that the user has viewed the object, whether the user is the producer of the object, and whether the user appears in the object). Therefore, calculating the eye-attracting force on the basis of the psychological distance between the user and the object leads to accurate calculation of the eye-attracting force, thereby resulting in accurate estimation of the user's degree of interest.

Preferably, the eye-attracting force calculation unit may be configured to calculate, for each of the objects, the psychological distance on the basis of a physical positional relationship between the user and the object. In this case, for example, the eye-attracting force calculation unit may be configured to calculate the eye-attracting force of each of the objects on the basis of a distance between the user and the object, such that the shorter the physical distance is the greater the eye-attracting force becomes. Also, for example, the eye-attracting force calculation unit may be configured to calculate the eye-attracting force of each of the objects on the basis of an angle defined by a line connecting the user and the object and a normal of the screen, such that the smaller the angle is the greater the eye-attracting force becomes.

Such arrangements enable calculation of the eye-attracting force based on the physical positional relationship between the user and the object. The eye-attracting force depends on the physical positional relationship between the user and the object (for example, physical distance between the user and the object, and direction of the object with respect to the user). For instance, the shorter physical distance between the user and the object induces the user to keep his/her eyes longer on that object. Therefore, calculating the eye-attracting force on the basis of the physical positional relationship between the user and the object leads to accurate calculation of the eye-attracting force, thereby resulting in accurate estimation of the user's degree of interest.

Further, it is preferable that the degree of interest estimation unit is configured to compensate the gaze duration such that the greater the eye-attracting force is the shorter the gaze duration becomes, thus to calculate a compensated gaze duration, and to estimate the degree of interest such that the longer the compensated gaze duration is the higher the degree of interest becomes. In this case, for example, the degree of interest estimation unit may be configured to calculate the compensated gaze duration by subtracting a time attributable to the eye-attracting force from the gaze duration. Also, for example, the degree of interest estimation unit may be configured to calculate the compensated gaze duration by dividing the gaze duration by a value attributable to the eye-attracting force.

Such arrangements enable estimation of the degree of interest based on the gaze duration compensated in accordance with the eye-attracting force. A portion of time unrelated to the user's degree of interest can thus be deducted from the gaze duration, and consequently the user's degree of interest can be accurately estimated.

Preferably, further, the user interface device may further comprise a display control unit configured to control a display on the screen in accordance with the degree of interest estimated. In this case, for example, the display control unit may be configured to cause the screen to display information on an object that has gained a highest estimated degree of interest among the plurality of objects. Also, for example, the display control unit may be configured to change a display mode of an object that has gained a highest estimated degree of interest among the plurality of objects, or the objects except for the object that has gained the highest estimated degree of interest among the plurality of objects.

Such arrangements enable the display on the screen to be controlled in accordance with the estimated degree of interest. For example, lowering display luminance of the plurality of objects except for the object that has gained a highest degree of interest contributes to saving power consumption for displaying the plurality of objects.

Still further, the user interface device may be constituted in a form of an integrated circuit.

It is to be noted that the present invention can be realized not only as the foregoing user interface device, but also as an input method including steps corresponding to the actions of the distinctive components of the user interface device. The present invention can also be realized as a program that causes a computer to execute the respective steps of the input method. Naturally, such a program can be distributed in a form of a readable non-temporary recording medium such as a compact disc read-only memory (CD-ROM), or a communication medium such as the internet.

The present invention enables highly accurate estimation of a user's degree of interest, for performing an input process on the basis of the user's degree of interest in a plurality of objects displayed on a screen.

BRIEF DESCRIPTION OF DRAWINGS

FIG. 2C is a schematic drawing for explaining still another example of camera location according to the embodiment of the present invention.

DETAILED DESCRIPTION OF INVENTION

Figure 1:
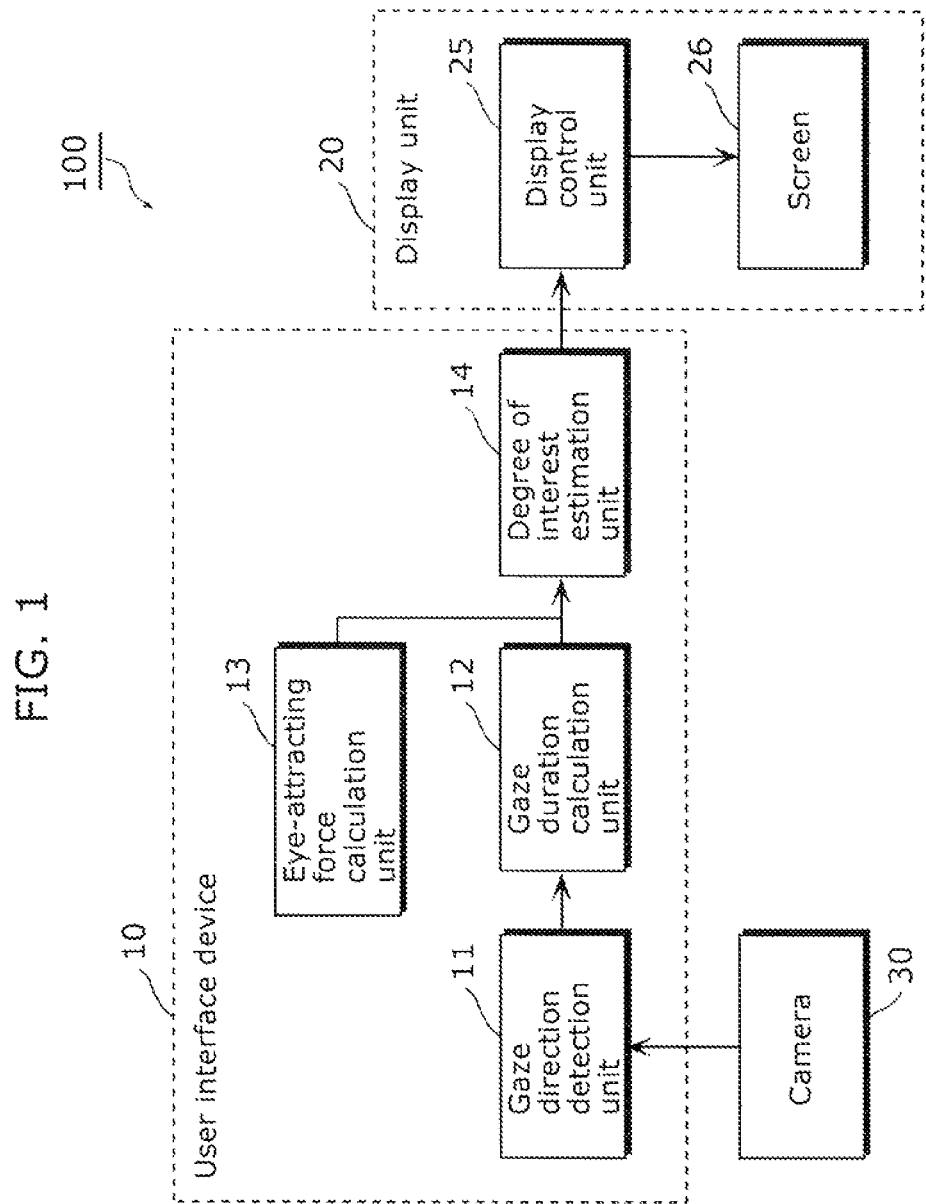
FIG. 1 is a block diagram showing a functional configuration of a user interface system according to an embodiment of the present invention.

Users tend to gaze at an object that has a greater eye-attracting force. For example, when a user looks at an object, the user gazes at an essential portion of the object for understanding what it represents. In the case where the essential portion of the object contains information that requires a certain time for understanding what it is, the gaze duration becomes longer.

Thus, the gaze duration includes a time during which the user looks at the object because of its eye-attracting force, in addition to a time during which the user gazes at the object because the user is positively interested in it. Accordingly, a user interface device 10 according to this embodiment estimates the user's degree of interest utilizing not only the gaze duration, but also the eye-attracting force of the objects.

Hereunder, the embodiment of the present invention will be described referring to the drawings.

FIG. 1 is a block diagram showing a functional configuration of a user interface system 100 according to the embodiment of the present invention. In this embodiment, the user interface system 100 includes the user interface device 10, a display unit 20, and a camera 30.

Functions of each block in FIG. 1 will be described hereunder.

The user interface device 10 estimates the user's degree of interest, for performing an input process on the basis of the user's degree of interest in a plurality of objects displayed on a screen 26.

Here, the object refers to information displayed on a part or whole of the screen 26. Specifically, the object includes contents such as photographs, moving pictures, and texts. The object also includes icons, menus and buttons utilized as a graphical user interface (GUI).

The degree of interest refers to a value indicating a level of interest that the user has in the content of the object displayed on the screen 26. In other words, the degree of interest is a value indicating how much the user is interested in the content of the object.

As shown in FIG. 1, the user interface device 10 includes a gaze direction detection unit 11, a gaze duration calculation unit 12, an eye-attracting force calculation unit 13, and a degree of interest estimation unit 14.

The gaze direction detection unit 11 detects a gaze direction of the user. In this embodiment, the gaze direction detection unit 11 detects the user's gaze direction from image information generated by the camera 30.

The gaze direction refers to a direction of a line connecting a point being gazed at by the user and an eye of the user. In other words, the gaze direction refers to a direction of a line connecting a user's gaze point on the screen 26 and the user's eye.

The gaze duration calculation unit 12 calculates a time during which the gaze direction has remained on each of the plurality of objects displayed on the screen 26. The time this calculated is the gaze duration. The gaze duration represents the time during which the gaze direction remains within a certain area. Specifically, the gaze duration represents a time during which the gaze point on the screen 26 defined by the gaze direction continuously stays within, for example, a display region of the object.

The eye-attracting force calculation unit 13 calculates the eye-attracting force of each object. The eye-attracting force refers to a value indicating how strongly the object attracts the user's eyes. In other words, the eye-attracting force is a value indicating how strongly the object visually draws the user's attention.

The degree of interest estimation unit 14 estimates the user's degree of interest such that the longer the gaze duration is the higher the degree of interest becomes, and that the smaller the eye-attracting force is the higher the degree of interest becomes.

In this embodiment, the degree of interest estimation unit 14 calculates a compensated gaze duration such that the greater the eye-attracting force is the shorter the gaze duration becomes. Then the degree of interest estimation unit 14 estimates the degree of interest such that the longer the compensated gaze duration is the higher the degree of interest becomes. Further, the degree of interest estimation unit 14 outputs the user's degree of interest thus estimated to the display unit 20.

The display unit 20 displays the plurality of objects on the screen 26. The display unit 20 includes a display control unit 25 and the screen 26.

The display control unit 25 controls the display on the screen 26, in accordance with the estimated degree of interest. Specifically, the display control unit 25 causes the screen 26 to display, for example, information on an object that has gained a highest estimated degree of interest among the plurality of objects. For example, when the object is a movie picture, the display control unit 25 displays the story, the director, and actors of the movie picture as information on the object.

Also, for example, the display control unit 25 may change a display mode of the object that has gained a highest estimated degree of interest among the plurality of objects. Specifically, the display control unit 25 may change the display mode of that object by increasing the display area, display luminance, or image clarity of the object.

Conversely, the display control unit 25 may change the display mode of the plurality of objects, except for the object that has gained a highest estimated degree of interest among the objects. For example, the display control unit 25 may lower the display luminance of the plurality of objects, except for the object that has gained a highest estimated degree of interest.

Such controlling actions of the display control unit 25 over the screen 26 in accordance with the degree of interest enables the display unit 20 to display information appropriate for the user on the screen 26, even without an express instruction of the user. Accordingly, the user interface system 100 can increase convenience for the user. The display unit 20 can also lower the display luminance of the object in accordance with the user's degree of interest, thereby contributing to reducing power consumption for displaying the plurality of objects.

The screen 26 may be, for example, an LCD panel or a plasma display panel. The screen 26 is driven by the display control unit 25 to display the plurality of objects.

The camera 30 shoots the user and generates image information. Specifically, the camera 30 includes an image sensor such as a charge coupled device (CCD) or a complementary metal-oxide semiconductor (CMOS). The camera 30 shoots the user located in front of the screen 26 of the display unit 20.

The camera 30 may be located around the display unit 20. Specifically, the camera 30 is located at a position that enables the camera 30 to shoot the user in front of the screen 26. More specifically, the camera 30 may be mounted, for example, at such a position as shown in FIGS. 2A to 2C.

Figure 2A:
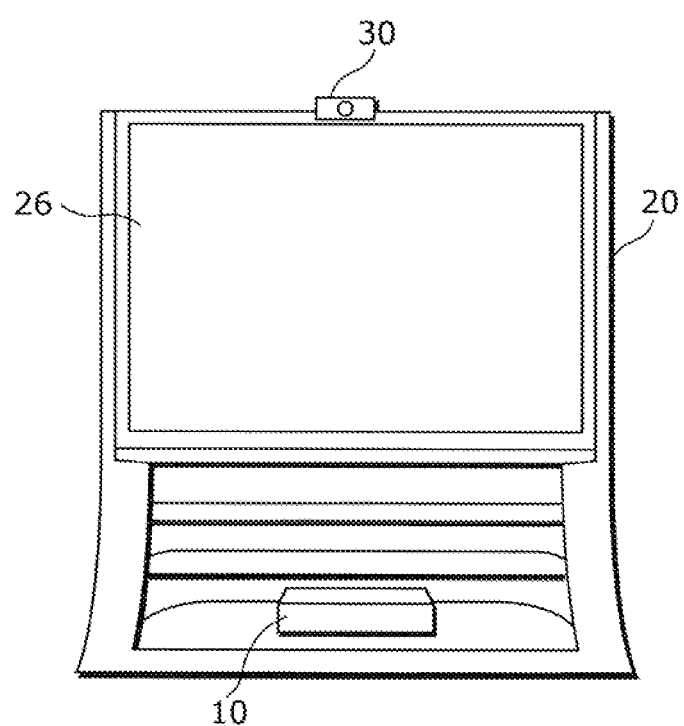
FIG. 2A is a schematic drawing for explaining an example of camera location according to the embodiment of the present invention.
Figure 2B:
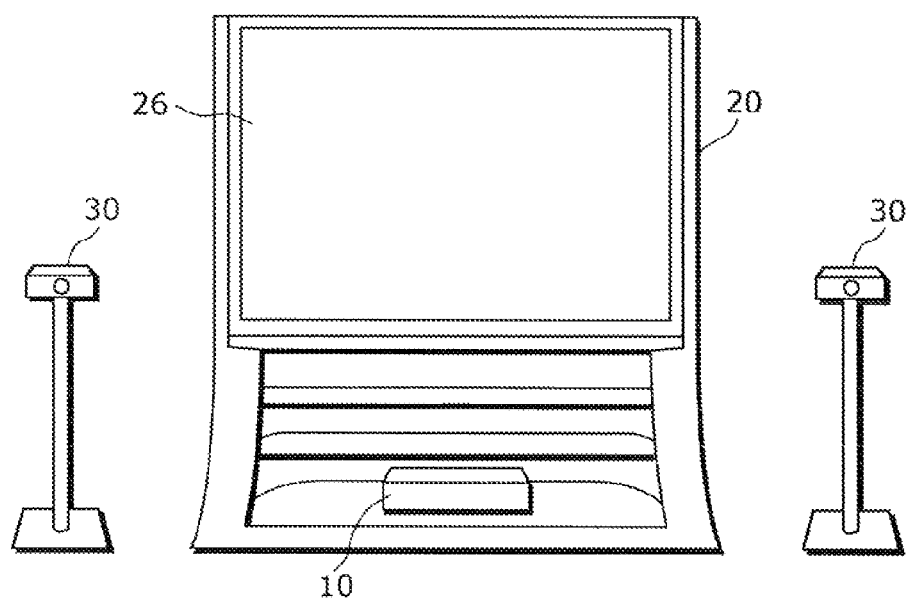
FIG. 2B is a schematic drawing for explaining another example of camera location according to the embodiment of the present invention.

FIGS. 2A to 2C are schematic drawings for explaining examples of camera location according to the embodiment of the present invention.

As shown in FIG. 2A for example, the camera 30 may be attached on top of the screen 26 of the display unit 20. Alternatively, as shown in FIG. 2B, the camera 30 may be placed in the vicinity of the screen 26, instead of being attached to the display unit 20. Further, as shown in FIG. 2C, the camera 30 may be mounted on a wall or ceiling of the room in which the display unit 20 is located. Thus, the camera 30 may be located at an appropriate position inside a space where the display unit 20 is located.

Hereunder, operation of the user interface device 10 thus configured will be described.

Figure 3:
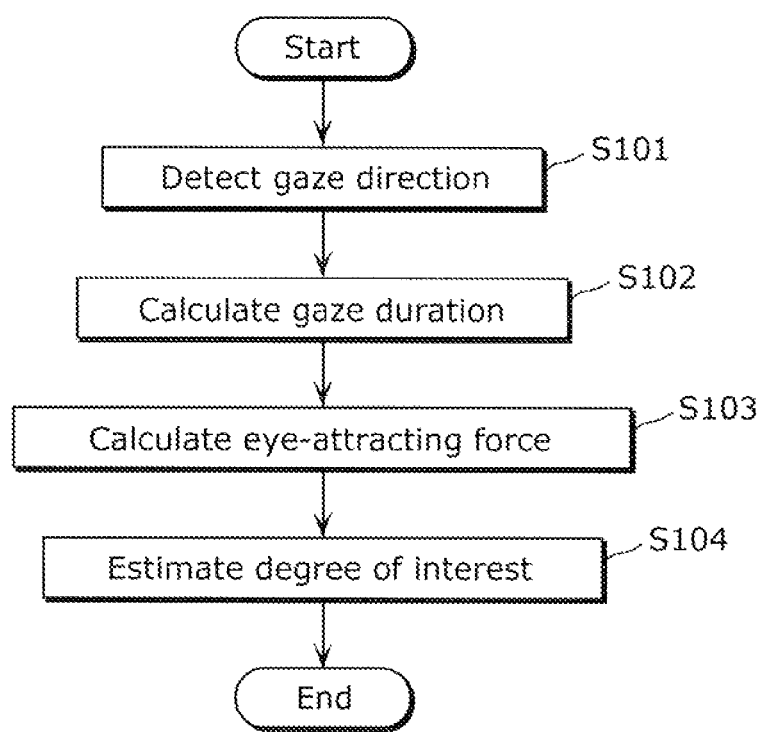
FIG. 3 is a flowchart showing an input method according to an embodiment of the present invention.

FIG. 3 is a flowchart showing an input method according to the embodiment of the present invention.

First, the gaze direction detection unit 11 detects the user's gaze direction (S101). Then the gaze duration calculation unit 12 calculates the gaze duration on each of the plurality of objects displayed on the screen (S102).

The eye-attracting force calculation unit 13 calculates the eye-attracting force of each object (S103). Finally, the degree of interest estimation unit 14 estimates the user's degree of interest in each of the plurality of objects, such that the longer the gaze duration is the higher the degree of interest becomes, and that the smaller the eye-attracting force is the higher the degree of interest becomes (S104).

Details of the foregoing steps included in the input method will be described hereunder.

1. Detection of Gaze Direction

Referring first to FIGS. 4 to 9, the gaze direction detection process (S101) will be described in details.

Figure 4:
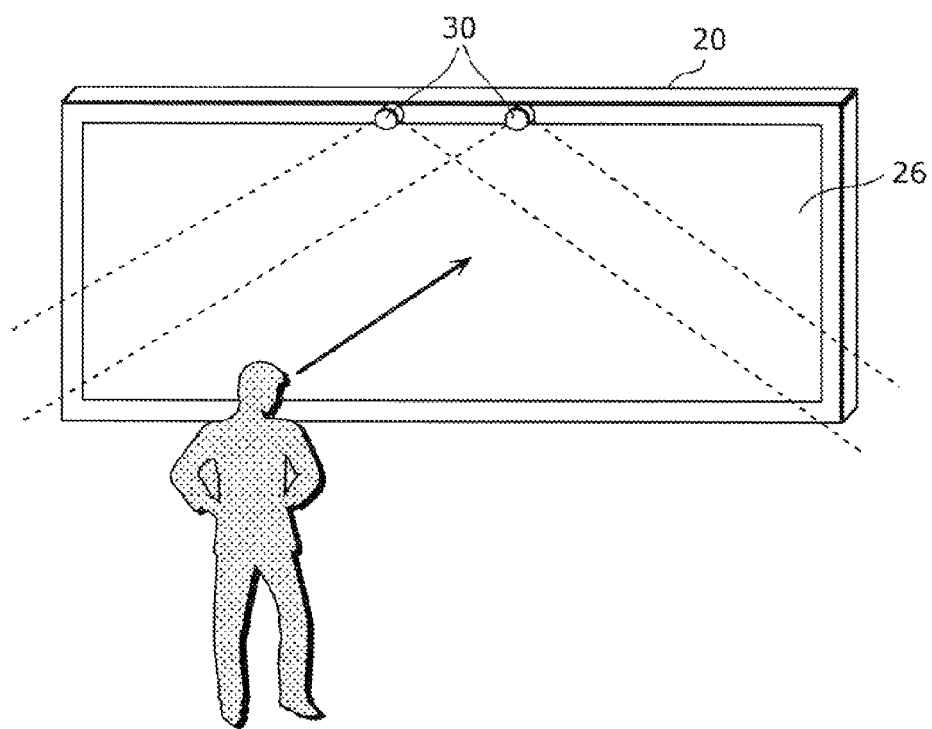
FIG. 4 is a schematic drawing for explaining a gaze direction detection process according to the embodiment of the present invention.

FIG. 4 is a schematic drawing for explaining the gaze direction detection process according to the embodiment of the present invention.

The following refers to the case of detecting the user's gaze direction from an image shot by the cameras 30 located close to the display unit 20, as shown in FIG. 4. The gaze direction is calculated on the basis of a combination of orientation of the user's face (hereinafter, simply "face orientation") and direction of a black part of the user's eye (hereinafter, simply "black part direction").

Figure 5:
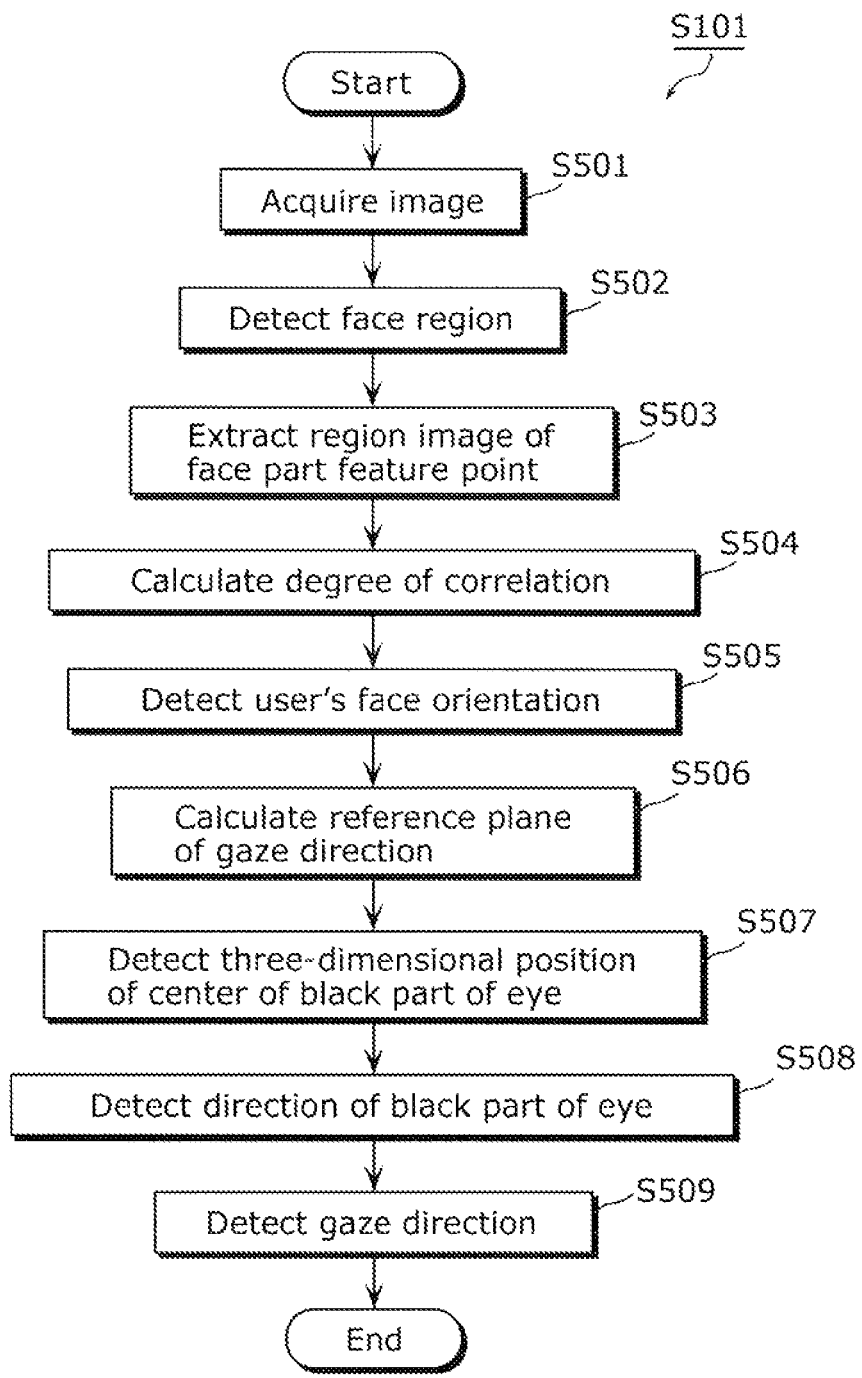
FIG. 5 is a flowchart showing a gaze direction detection process according to the embodiment of the present invention.

FIG. 5 is a flowchart showing a gaze direction detection process according to the embodiment of the present invention.

First, the gaze direction detection unit 11 acquires an image of the user located in front of the screen 26, shot by the camera 30 (S501). The gaze direction detection unit 11 then detects a face region from the acquired image (S502). Thereafter, the gaze direction detection unit 11 applies a region of face part feature points corresponding to each reference face orientation to the detected face region, and extracts a region image of each face part feature point (S503).

The gaze direction detection unit 11 then calculates a degree of correlation between the region image thus extracted and a template image stored in advance (S504). After that, the gaze direction detection unit 11 calculates a weighted sum by adding a weight in proportion to a ratio of the calculated degree of correlation to an angle indicated by each reference face orientation, and detects such orientation as the user's face orientation corresponding to the face region detected as above (S505).

Figure 6:
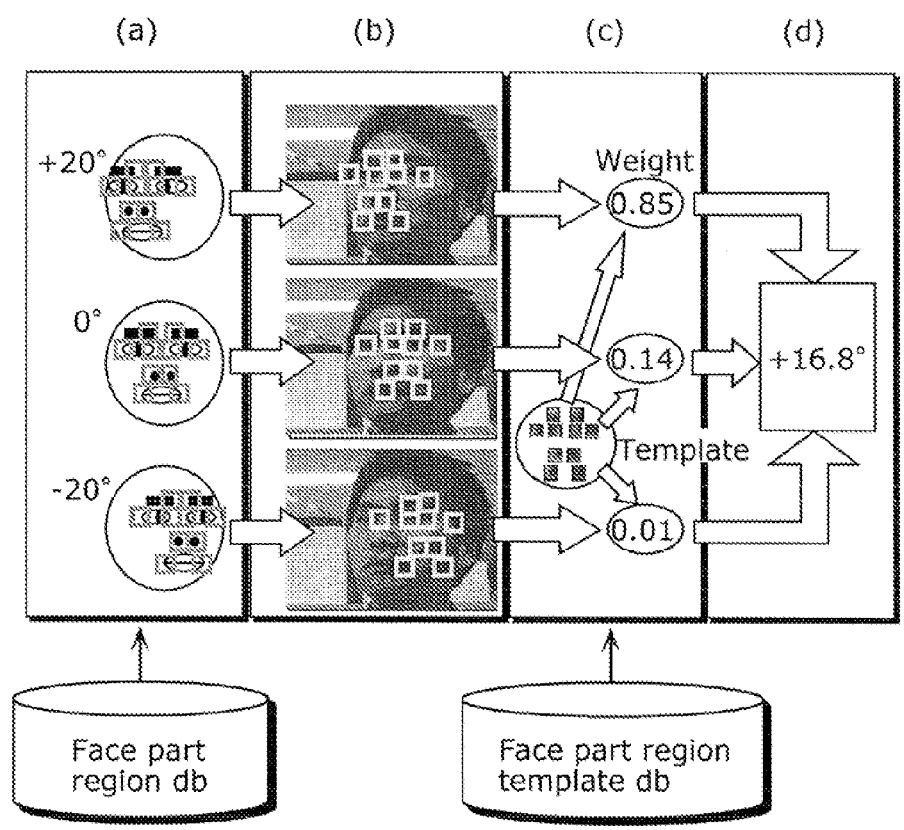
FIG. 6 is a schematic diagram for explaining a face orientation detection process according to the embodiment of the present invention.

FIG. 6 is a schematic diagram for explaining a face orientation detection process according to the embodiment of the present invention.

The gaze direction detection unit 11 reads out the region of the face part feature point from a face part region DB storing the face part feature point corresponding to each reference face orientation, as shown in (a) of FIG. 6. The gaze direction detection unit 11 then applies the region of the face part feature point to the face region of the shot image, with respect to each reference face orientation as shown in (b) of FIG. 6, and extracts the region image of the face part feature point, with respect to each reference face orientation.

Then the gaze direction detection unit 11 calculates, as shown in (c) of FIG. 6, the degree of correlation between the extracted region image and the template image stored in the face part region template DB, with respect to each reference face orientation. Also, the gaze direction detection unit 11 calculates a weight of each reference face orientation, in proportion to a level of the correlation indicated by the calculated degree of correlation. For example, the gaze direction detection unit 11 adopts a ratio of the degree of correlation of each reference face orientation with respect to the total sum of the degree of correlation of the reference face orientation, as the weight for the calculation.

Thereafter, the gaze direction detection unit 11 calculates, as shown in (d) of FIG. 6, a total sum of values obtained by multiplying the angle indicated by the reference face orientation by the weight obtained as above, and detects the calculation result as the user's face orientation.

According to (d) of FIG. 6, the weight on the reference face orientation (+20 degrees) is "0.85", the weight on a forward orientation is "0.14", and the weight on −20 degrees is "0.01".

Accordingly, the gaze direction detection unit 11 detects the face orientation as 16.8 degrees (=20×0.85+0×0.14+(−20)×0.01).

Here, the gaze direction detection unit 11 calculates the degree of correlation with respect to the region image corresponding to the face part feature point in FIG. 6, the degree of correlation may instead be calculated with respect to an image of the entire face region. Other examples of the face orientation detecting method include detecting the face part feature points such as eyes, nose, and mouth from a face image, and calculating the face orientation on the basis of the positional relationship between such face part feature points.

To calculate the face orientation on the basis of the positional relationship between the face part feature points, a three-dimensional model of the face part feature points prepared in advance may be rotated, enlarged or reduced in size so as to achieve best matching with the face part feature points obtained from a single camera, and the face orientation may be calculated on the amount of rotation of the three-dimensional model. Other examples of the calculation method of the face orientation from the positional relationship between the face part feature points include utilizing images shot by two cameras, on the basis of a principle of stereoscopy, such as calculating a three-dimensional position of each face part feature point from deviation of the face part feature points between the respective images of the left and right cameras, and calculating the face orientation on the basis of the positional relationship between the face part feature points thus obtained. For example, a direction of a normal of a plane drawn on a three-dimensional coordinate points defined by the eyes and the mouth may be detected as the face orientation.

Here, reference will again be made to the flowchart shown in FIG. 5.

The gaze direction detection unit 11 detects a three-dimensional position of the inner canthus of both eyes of the user utilizing the stereoscopic image shot by the camera 30, and calculates a gaze direction reference plane utilizing the detected three-dimensional position of the inner canthus of the eyes (S506). Then the gaze direction detection unit 11 detects a three-dimensional position of the center of the black part of both eyes utilizing the stereoscopic image shot by the camera 30 (S507). The gaze direction detection unit 11 then detects the black part direction utilizing the gaze direction reference plane and the three-dimensional position of the center of the black part of both eyes (S508).

Thereafter, the gaze direction detection unit 11 detects the user's gaze direction utilizing the detected face orientation and the black part direction of the user (S509).

Figure 7:
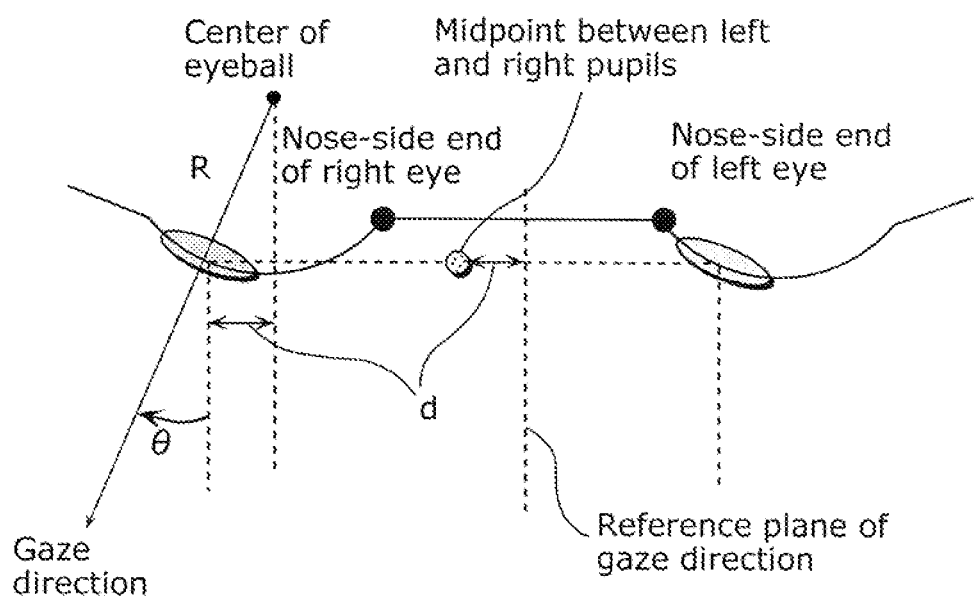
FIG. 7 is a schematic diagram for explaining calculation of a gaze direction reference plane according to the embodiment of the present invention.
Figure 8:
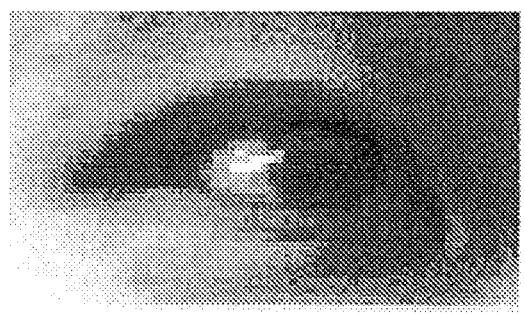
FIG. 8 is a photograph for explaining detection of a center of black part of eye according to the embodiment of the present invention.
Figure 9:
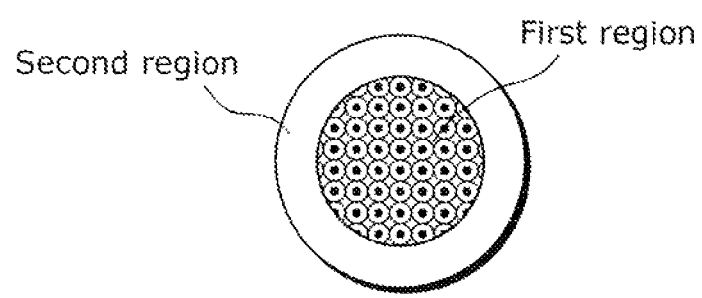
FIG. 9 is a schematic drawing for explaining detection of a center of black part of eye according to the embodiment of the present invention.

Referring now to FIGS. 7 to 9, details of the detection of the black part direction will be described.

In this embodiment, the gaze direction detection unit 11 first calculates the gaze direction reference plane. The gaze direction detection unit 11 then detects the three-dimensional position of the center of the black part of both eyes. Finally, the gaze direction detection unit 11 detects the black part direction.

First, the calculation of the gaze direction reference plane will be described.

FIG. 7 is a schematic diagram for explaining the calculation of the gaze direction reference plane according to the embodiment of the present invention. The gaze direction reference plane refers to a plane that serves as the reference for detecting the black part direction, and coincides with a vertical plane of symmetry of one's face, as shown in FIG. 7. The position of the inner canthus fluctuates less compared with other face parts such as an outer canthus, corners of the mouth, and eyebrows, and is less likely to be erroneously detected. Accordingly, the gaze direction detection unit 11 calculates the gaze direction reference plane, which coincides with the vertical plane of symmetry of the face, utilizing the three-dimensional position of the inner canthus of both eyes.

Specifically, the gaze direction detection unit 11 detects an inner canthus region of both eyes in each of the two images (stereoscopic images) shot by a stereoscopic camera exemplifying the camera 30, utilizing a face detection module and a face part detection module. The gaze direction detection unit 11 then measures the three-dimensional position of the inner canthus of the respective eyes, utilizing the detected deviation of the inner canthus region (parallax) between the images. Then, the gaze direction detection unit 11 calculates a vertical bisecting plane of a line having the end points at the three-dimensional positions of the inner canthus of the respective eyes as the gaze direction reference plane, as shown in FIG. 7.

The detection of the center of the black part of eyes will now be described.

FIGS. 8 and 9 are schematic drawings for explaining the detection of the center of black part of the eye according to the embodiment of the present invention.

One visually recognizes an object when light from the object reaches the retina through the pupil and converted into an electrical signal, and the electrical is transmitted to the brain. Accordingly, the gaze direction can be detected by utilizing the position of the pupil. However, since the iris of Japanese people is black or brown, it is difficult to distinguish the pupil and the iris by image processing. In this embodiment, therefore, the gaze direction detection unit 11 detects the center of the black part of the eye for detecting the black part direction, because the center of the pupil and that of the black part (including both the pupil and the iris) substantially coincide.

The gaze direction detection unit 11 first detects the positions of the inner and outer canthus, from the acquired image. The gaze direction detection unit 11 then detects a region where luminance is low in a region including the inner and outer canthus shown in FIG. 8, as a black part region. Specifically, the gaze direction detection unit 11 detects, for example, a region where the luminance is below a predetermined threshold and that is larger than a predetermined size, as the black part region.

The gaze direction detection unit 11 sets a black part detection filter including a first region and a second region as shown in FIG. 8, at a desired position in the black part region. Then, the gaze direction detection unit 11 searches for a position of the black part detection filter that makes inter-region dispersion between luminance of pixels in the first region and that of the second region maximal, and detects a position indicated as a result of the search as the center of the black part. Finally, the gaze direction detection unit 11 detects the three-dimensional position of the center of the black part, utilizing the positional deviation of the respective centers of the black part in the stereoscopic images, as above.

The detection of the black part direction will be described in further described.

The gaze direction detection unit 11 detects the black part direction utilizing the calculated gaze direction reference plane and the detected three-dimensional position of the center of the black part. It is known that a size of eyeball is barely different among adults, and is approx. 24 mm in the case of Japanese people. Accordingly, provided that the position of the center of the black part corresponding to a reference orientation (for example, a forward orientation) is known, converting calculation into the black part direction can be made by obtaining a displacement therefrom to the current position of the center of the black part.

On the basis of the fact that when the user is oriented forward the midpoint between the centers of the black part of the respective eyes falls on the center of the face, i.e., the gaze direction reference plane, the gaze direction detection unit 11 calculates a distance between the midpoint between the centers of the black part and the gaze direction reference plane, thereby detecting the black part direction.

More specifically, the gaze direction detection unit 11 calculates, as expressed by the following equation (1), an angle of rotation 8 in a left and right direction with respect to the face orientation as the black part direction, utilizing a radius of the eyeball R and a distance d between the gaze direction reference plane and the midpoint of a line connecting the centers of the black part of the respective eyes (hereinafter, "midpoint between black parts").

[Math. 1]

$$\hat{-} = \sin^{-1}(d/R) \qquad (1)$$

R: Radius of eyeball (12 mm)
D: Distance between the gaze direction reference plane and the midpoint between black parts Thus, the gaze direction detection unit 11 detects the black part direction utilizing the gaze direction reference plane and the three-dimensional position of the centers of the black part. Then the gaze direction detection unit 11 detects the gaze direction of the user in an actual space, utilizing the detected face orientation and black part direction.

2. Calculation of Gaze Duration

Hereunder, the calculation of the gaze duration (S102) will be described in details.

The gaze duration calculation unit 12 calculates a time during which the gaze direction has remained on each object on the screen 26, on the basis of the gaze direction detected by the gaze direction detection unit 11. In other words, the gaze duration calculation unit 12 calculates the time during which the gaze direction has stayed still in order to look at the object on the screen 26, for each of the objects.

More specifically, the gaze duration calculation unit 12 acquires, for example, the three-dimensional position of the user's eyes. The gaze duration calculation unit 12 then calculates an intersection point of a line extending in the gaze direction from the three-dimensional position of the user's eyes and the screen 26, as the gaze point. Then, the gaze duration calculation unit 12 calculates, for each object, a time during which the gaze point has continuously remained in the display region of the object, as the gaze duration.

Here, it is not mandatory that the gaze duration calculation unit 12 calculates the gaze duration as described above. For example, the gaze duration calculation unit 12 may calculate a time during which the gaze point has continuously remained within a predetermined area around the display region of the object as the gaze duration, for each object. Alternatively, for example, the gaze duration calculation unit 12 may assume that the gaze point has continuously remained in the display region of the object in the case where the gaze point has once moved out of the display region but has returned thereto within a predetermined period of time, and calculate the gaze duration accordingly.

3. Calculation of Eye-Attracting Force

The calculation of the eye-attracting force (S103) will now be described in details.

As stated earlier, the eye-attracting force refers to a level of ability to draw visual attention. Specifically, the eye-attracting force is a value indicating how strongly an image of each object displayed on the screen attracts the user's eyes.

The eye-attracting force generally depends on a physical feature of the image. For example, the higher the brightness and chroma of the color or texture of the image are, the higher potential for attracting the user's eyes the image has. Also, the more dissimilar in physical feature the image is from images located around that image, the more likely the image can attract the user's eyes.

The eye-attracting force depends also on a psychological distance between the user and the object. For example, an image more closely associated with the user, and an image that has been viewed a greater number of times by the user are more capable of attracting the user's eyes.

Here, the psychological distance refers to a psychological relationship between the user and the object. The psychological distance becomes shorter when the psychological relationship between the user and the object is closer.

Further, the eye-attracting force depends on a physical positional relationship between the user and the object. In other words, the eye-attracting force is influenced by a positional relationship between the location of the user and the position where the object is displayed. For example, an image displayed in front of the user is more capable of attracting the user's eyes.

Accordingly, the eye-attracting force calculation unit 13 calculates an eye-attracting force A(i) of an object i as expressed by the following equation (2).

[Math. 2]

$$A(i) = a1 \times A\text{image}(i) + a2 \times A\text{psy}(i) + a3 \times A\text{phy}(i) \qquad (2)$$

In the equation cited above, Aimage(i) represents an eye-attracting force based on a physical feature of an image of the object i. Accordingly, the eye-attracting force calculation unit 13 calculates the eye-attracting force on the basis of the physical feature of the image of the object, for each object.

Also, Apsy(i) represents an eye-attracting force based on a psychological distance between the user and the object i. Accordingly, the eye-attracting force calculation unit 13 calculates the eye-attracting force such that the shorter the psychological distance between the user and the object is the greater the eye-attracting force becomes, for each object.

Further, Aphy(i) represents an eye-attracting force based on a physical positional relationship between the user and the object i. Accordingly, the eye-attracting force calculation unit 13 calculates the eye-attracting force on the basis of the physical positional relationship between the user and the object, for each object.

Further, a1, a2, and a3 are adjustment parameters for adjusting an impact of the respective terms on the eye-attracting force. Predetermined numerical values not smaller than 0 are given to a1, a2, and a3. For example, a2 and a3 may be specified as 0 and a1 may be given a value greater than 0, as the following equation (3). In other words, it suffices that at least one of a1, a2, and a3 is given a value greater than 0.

[Math. 3]

$$a2=0, a3=0 \qquad (3)$$

Thus, the eye-attracting force calculation unit 13 may calculate the eye-attracting force on the basis of at least one of the physical feature of the image of the object, the psychological distance between the user and the object, and the physical positional relationship between the user and the object.

Here, Aimage(i), Apsy(i), and Aphy(i) can each be defined as the following equations (4) to (6).

[Math. 4]

$$A\text{image}(i) = i1 \times \text{complex}(i) + i2 \times \text{hetero}(i) \tag{4}$$

[Math. 5]

$$A\text{psy}(i) = s1 \times e\_st(i) + s2 \times e\_sb(i) + s3 \times e\_w(i) \tag{5}$$

[Math. 6]

$$A\text{phy}(i) = h1/\text{dist}(i) + h2/\text{ang}(i) \tag{6}$$

Here, i1, i2, s1, s2, s3, h1, and h2 are adjustment parameters for adjusting an impact of the respective terms on the eye-attracting force. Predetermined numerical values not smaller than 0 are given to i1, i2, s1, s2, s3, h1, and h2.

In the equation (4), complex(i) represents a degree of complexity of the image of the object i. Accordingly, the eye-attracting force calculation unit 13 calculates, for each object, the eye-attracting force on the basis of the degree of complexity of the image of the object, such that the higher the degree of complexity is the greater the eye-attracting force becomes.

Also, hetero(i) represents a degree of heterogeneity of the image of the object i from other images located close to the object i. Accordingly, the eye-attracting force calculation unit 13 calculates, for each object, the eye-attracting force on the basis of the degree of heterogeneity of the image of the object from the images located around the object, such that the higher the degree of heterogeneity is the greater the eye-attracting force becomes.

In the equation (5), e_st(i) is specified as "1" in the case where the user is a producer of the object i, and as "0" in the negative case. Accordingly, the eye-attracting force calculation unit 13 calculates, for each object, the psychological distance on the basis of whether the user is the producer of the object, such that the psychological distance becomes shorter in the affirmative case than in the negative case.

In this case, the user interface device 10 may accept in advance from the user an input of ID information for identifying the user, to thereby decide whether the user is the producer of the object referring to the ID information. Here, the information for identifying the producer of the object may be stored in advance, for example, in a storage unit (not shown) in association with the object.

Also, e_sb(i) is specified as "1" in the case where the user is a subject displayed in the object i, and as "0" in the negative case. Accordingly, the eye-attracting force calculation unit 13 calculates, for each object, the psychological distance on the basis of whether the user is the subject displayed in the object, such that the psychological distance becomes shorter in the affirmative case than in the negative case.

In this case also, the user interface device 10 may accept in advance from the user the input of the ID information for identifying the user, to thereby decide whether the user is the subject displayed in the object referring to the ID information. Here, the information for identifying the producer of the object may be stored in advance, for example, in a storage unit (not shown) in association with the object.

Further, e_w(i) represents the number of times that the user has so far viewed the object i (hereinafter, simply "viewing times"). Accordingly, the eye-attracting force calculation unit 13 calculates, for each object, the psychological distance such that the greater the number of times that the user has so far viewed the object is the shorter the psychological distance becomes.

In the equation (6), dist(i) represents a physical distance between the user and the object i. Accordingly, the eye-attracting force calculation unit 13 calculates, for each object, the eye-attracting force such that the shorter the physical distance between the user and the object is the greater the eye-attracting force becomes.

Also, ang(i) represents an angle defined by a line connecting the user and the object i and a normal of the screen 26. Accordingly, the eye-attracting force calculation unit 13 calculates, for each object, the eye-attracting force on the basis of the angle defined by the line connecting the user and the object and the normal of the screen 26, such that the smaller the angle is the greater the eye-attracting force becomes.

Now, calculation of complex(i), representing the degree of complexity of the image of the object i, will be described.

First, the eye-attracting force calculation unit 13 divides the image of the object i into regions by a known image processing method. The eye-attracting force calculation unit 13 then calculates complex (i) in accordance with the number of regions obtained by the division, such that the greater the number of regions is the higher the degree of complexity becomes.

Specifically, the eye-attracting force calculation unit 13 may calculate the degree of complexity, for example by the method disclosed in PTL 3 (Japanese Unexamined Patent Application Publication No. 2007-18025). Naturally, the method according to PTL 3 is merely an example of the calculation method of the degree of complexity of the image, and the present invention is in no way limited thereto.

Calculation of hetero(i), representing the degree of heterogeneity of the object i from images located around the object i will now be described.

The eye-attracting force calculation unit 13 calculates a difference in color and texture between the object i and the images around the object i as the degree of heterogeneity. The color and texture of each image correspond to, for example, a color and texture that occupy a largest area in the image.

Specifically, the eye-attracting force calculation unit 13 may calculate the degree of heterogeneity, for example by the method disclosed in NPL 2 (Shoji TANAKA, Seiji IGUCHI, Yuichi IWADATE, Ryohei NAKATSU: Attractiveness Evaluation Model based on the Physical Features of Image Regions, IEICE Journal A, Vol. J83-A, No. 5, pp. 576-588, 2000). Naturally, the method according to NPL 2 is merely an example of the calculation method of the degree of heterogeneity, and the present invention is in no way limited thereto.

Hereunder, description will be given on the calculation method of the degree of heterogeneity disclosed in NPL 2.

The degree of heterogeneity in physical feature value can be obtained by the following equation (7), where d represents a difference between the feature value and a mean of feature values of the entire regions, dm represents a mean of d, and std represents a standard deviation of d.

[Math. 7]

$$H(d, m, std) = |(d - dm)/std| \tag{7}$$

For example, the eye-attracting force calculation unit 13 may calculate a color difference between an average color of the image region of the object i and an average color of the entire screen including the images around the object, and a mean and a standard deviation of the color difference. The eye-attracting force calculation unit 13 then substitutes the calculation result in the equation (7), thereby calculating the degree of heterogeneity HC(i) of the color of the image of the object i.

Here, the color difference may be calculated in accordance with, for example, the color difference formula based on the CIEL*a*b* color space formulated by Commission Internationale de l'Eclairage (CIE).

Also, for example, the eye-attracting force calculation unit 13 may calculate a texture feature vector described in NPL 3 (B. S. Manjunath, W. Y. Ma: Texture features for browsing and retrieval of image data, IEEE Trans. Pattern Anal. And Mach. Intell., Vol. 18, No. 8, pp. 837-842, 1996), as the feature value of the texture. In this case, the eye-attracting force calculation unit 13 calculates an Euclidean distance between the texture feature vectors, as the difference between the texture feature values. Then, the eye-attracting force calculation unit 13 substitutes the color difference between the average color of the image region of the object i and the average color of the entire screen including the images around the object, and the mean and the standard deviation of the color difference into the equation (7), thereby calculating the degree of heterogeneity HT(i) of the texture of the image of the object i.

4. Estimation of Degree of Interest

Hereunder, the estimation of the degree of interest (S104) will be described.

The degree of interest estimation unit 14 estimates the user's degree of interest in each of the plurality of objects displayed on the screen 26, such that the longer the gaze duration is the higher the degree of interest becomes, and that the smaller the eye-attracting force is the higher the degree of interest becomes. In this embodiment, the degree of interest estimation unit 14 first compensates the gaze duration so as to shorten the gaze duration as the eye-attracting force becomes greater, thereby calculating the compensated gaze duration. The degree of interest estimation unit 14 then estimates the degree of interest such that the longer the compensated gaze duration thus calculated is, the higher the degree of interest becomes.

4-1. Compensation of Gaze Duration

Figure 10:
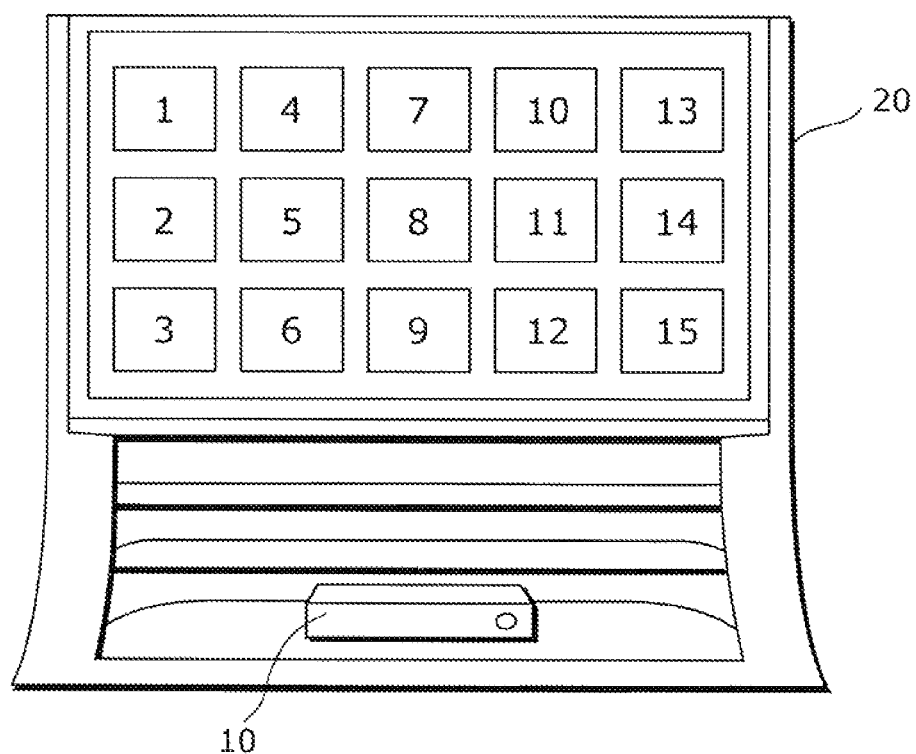
FIG. 10 is a schematic drawing showing a display example of objects according to the embodiment of the present invention.
Figure 11A:
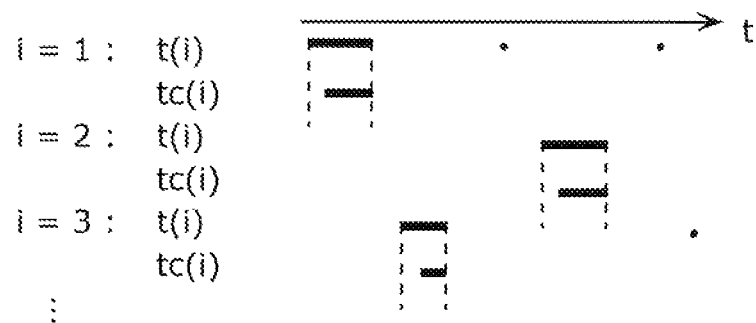
FIG. 11A is a schematic diagram for explaining an example of a gaze duration compensation method according to the embodiment of the present invention.
Figure 11B:
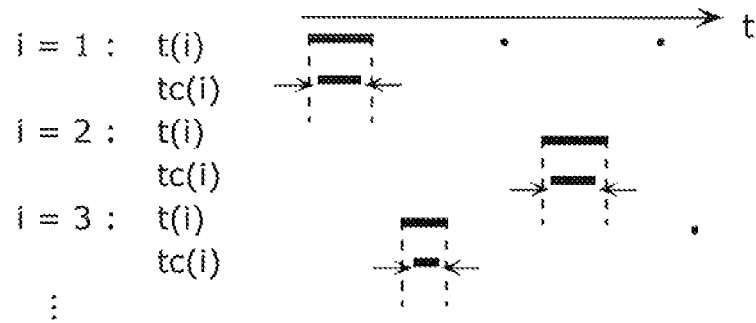
FIG. 11B is a schematic diagram for explaining another example of the gaze duration compensation method according to the embodiment of the present invention.

Referring to FIGS. 10 to 11B, the compensation of the gaze duration will first be described.

FIG. 10 is a schematic drawing showing a display example of the objects according to the embodiment of the present invention.

The following description is based on the case where 15 pieces of objects are displayed on the screen 26, as shown in FIG. 10. Here, numerals shown on the screen 26 in FIG. 10 correspond to identifiers (i) of the respective objects.

FIGS. 11A and 11B are schematic diagrams for explaining an example of the gaze duration compensation method according to the embodiment of the present invention. Specifically, FIG. 11A serves for explanation of a method of calculating the compensated gaze duration by subtracting a portion of time attributable to the eye-attracting force from the gaze duration.

As shown in FIG. 11A, the degree of interest estimation unit 14 calculates the compensated gaze duration in accordance with the following equation (8). In other words, the degree of interest estimation unit 14 calculates the compensated gaze duration by subtracting a portion of time attributable to the eye-attracting force, from the gaze duration.

[Math. 8]

$$Tc(i)=T(i)-A(i) \times ga(ga>0) \qquad (8)$$

In the equation cited above, T(i) represents the gaze duration with respect to the object i. Tc(i) represents the compensated gaze duration with respect to the object i. Also, ga is an adjustment parameter for adjusting the amount of compensation.

Here, it is not mandatory that the degree of interest estimation unit 14 calculates the compensated gaze duration by subtracting a portion of time attributable to the eye-attracting force, from the gaze duration. For example, the degree of interest estimation unit 14 may calculate the compensated gaze duration by dividing the gaze duration by a value attributable to the eye-attracting force.

FIG. 11B serves for explanation of the method of calculating the compensated gaze duration by dividing the gaze duration by a value attributable to the eye-attracting force. As shown in FIG. 11B, degree of interest estimation unit 14 calculates the compensated gaze duration in accordance with the following equation (9). In other words, the degree of interest estimation unit 14 calculates the compensated gaze duration by dividing the gaze duration by the value attributable to the eye-attracting force. Thus, the degree of interest estimation unit 14 compensates the gaze duration by shortening the gaze duration in proportion to the eye-attracting force.

[Math. 9]

$$Tc(i)=T(i)/A(i) \times gb(gb>0) \qquad (9)$$

In the equation cited above, gb is an adjustment parameter for adjusting the compensation amount.

Thus, the degree of interest estimation unit 14 calculates the compensated gaze duration by compensating the gaze duration such that the greater the eye-attracting force is the shorter the gaze duration becomes.

4-2. Estimation of Degree of Interest

Then the degree of interest estimation unit 14 estimates the degree of interest as the following equation (10), utilizing the compensated gaze duration calculated as above. Specifically, the degree of interest estimation unit 14 estimates the degree of interest such that the longer the compensated gaze duration is the higher the degree of interest becomes.

[Math. 10]

$$I(i)=Tc(i) \times k(k>0) \qquad (10)$$

In the equation cited above, I(i) represents the degree of interest. Also, k is an adjustment parameter for adjusting the magnitude of the value of the degree of interest.

As described thus far, the user interface device 10 according to this embodiment employs the compensated gaze duration obtained utilizing the eye-attracting force of the object for estimating the user's degree of interest, instead of utilizing the gaze duration as it is. Such an arrangement suppresses influence of a portion of time, included in the gaze duration, unrelated to the degree of interest (for example, time for watching the object because the image is so complicated that the content cannot be understood at a glance, and time spent for looking at the object simply because of its strong stimulation), when estimating the user's degree of interest utilizing the gaze duration.

Thus, the user interface device 10 is capable of estimating the user's degree of interest on the basis of the eye-attracting force of each of the objects. When the object has a strong eye-attracting force, the user is induced to look at the object despite that the user is not interested in that object. Thus, the gaze duration fluctuates depending not only on the user's degree of interest in the object, but also on the eye-attracting force of the object. Accordingly, the user interface device 10 estimates the degree of interest on the basis of the eye-attracting force, thereby suppressing the influence of a portion of time unrelated to the degree of interest included in the gaze duration, on the estimation of the degree of interest. Consequently, the user interface device 10 is capable of estimating the user's degree of interest in the object with high accuracy.

Also, the user interface device 10 is capable of calculating the eye-attracting force on the basis of the physical feature of the object. The eye-attracting force depends on the physical feature of the object (for example, degree of complexity and degree of heterogeneity of the object). For instance, in the case where the image of the object has a highly degree of complexity, the user keeps his/her eyes longer on that object for understanding its content. Therefore, calculating the eye-attracting force on the basis of the physical feature of the object leads to accurate calculation of the eye-attracting force, thereby resulting in accurate estimation of the user's degree of interest.

The user interface device 10 can also calculate the eye-attracting force on the basis of the psychological distance between the user and the object. The eye-attracting force depends on the psychological distance between the user and the object (for example, the number of times that the user has viewed the object, whether the user is the producer of the object, and whether the user appears in the object). Therefore, the user interface device 10 is capable of accurately calculating the eye-attracting force on the basis of the psychological distance between the user and the object, thereby estimating the user's degree of interest with high accuracy.

Further, the user interface device 10 can calculate the eye-attracting force on the basis of the physical positional relationship between the user and the object. The eye-attracting force depends on the physical positional relationship between the user and the object (for example, physical distance between the user and the object, and direction of the object with respect to the user). For instance, in the case where the physical distance between the user and the object is shorter, the user keeps his/her eyes longer on that object. Therefore, the user interface device 10 is capable of accurately calculating the eye-attracting force on the basis of the physical positional relationship between the user and the object, thereby estimating the user's degree of interest with high accuracy.

Further, the user interface device 10 can estimate the degree of interest on the basis of the gaze duration compensated utilizing the eye-attracting force. Therefore, the user interface device 10 can deduct a portion of time unrelated to the user's degree of interest from the gaze duration, thereby estimating the user's degree of interest with high accuracy.

Although the user interface system 100 according to the present invention has been described on the basis of the foregoing embodiment, the present invention is in no way limited to the embodiment. Various modifications conceivable to those skilled in the art and applied to the embodiment are also included in the scope of the present invention, unless such modifications deviate from the spirit of the present invention.

For example, although the gaze direction detection unit 11 detects the gaze direction on the basis of image information generated by the camera 30 according to the foregoing embodiment, naturally the gaze direction detection method is not limited to utilizing the image information. Examples of other method of detecting the gaze direction include utilizing a measuring device attached to the user (first method), and utilizing a non-contact device such as an infrared light source (second method).

Specific examples of the first method include electro-oculography (EOG) that detects an eyeball movement on the basis of cornea-retina potential fluctuation acquired from electrodes attached to the user's head, and a search coil method of detecting the eyeball movement on the basis of induced current generated on a contact lens with a built-in coil. The first method also includes detecting the gaze direction utilizing a wearable eye camera of a helmet type or glasses type.

Examples of the second method include a corneal reflection method of irradiating the eye with a point light source of near infrared light and estimating the gaze direction on the basis of a Purkinje image reflected by the cornea and a position of the pupil.

Also, though the degree of interest estimation unit 14 calculates the compensated gaze duration in the embodiment, the calculation of the compensated gaze duration is not mandatory. For example, the degree of interest estimation unit 14 may first estimate the degree of interest on the basis of the gaze duration, and compensate the degree of interest thus estimated, utilizing the eye-attracting force.

Although the display unit 20 includes the display control unit 25 in the embodiment, the user interface device 10 may include the display control unit 25. In this case, the user interface device 10 may be named as a screen control unit. Also, the user interface device 10 may include the screen 26 in addition to the display control unit 25. In this case, the user interface device 10 may be named as a display unit.

Further, although the display unit 20 controls the display on the screen on the basis of the estimated degree of interest in the embodiment, it is not mandatory to control the display on the screen. For example, the display unit 20 may output a sound in accordance with the degree of interest. Specifically, the display unit 20 may output, for example, a sound (such as a mechanical voice) announcing information on an object that has gained a highest degree of interest among the plurality of objects.

Although the user interface device 10 is located outside the display unit 20 according to FIGS. 2A to 2C, the user interface device 10 may be placed inside the display unit 20.

Further, the user interface device according to an aspect of the present invention may be modified as below.

(1) The foregoing user interface device is actually a computer system constituted of a microprocessor, a read-only memory (ROM), a random access memory (RAM), a hard disk unit, a display unit, a keyboard, a mouse, and so forth. The RAM or the hard disk unit stores a computer program. By operation of the microprocessor in accordance with the computer program, the components perform the respective functions. Here, the computer program is constituted of combinations of a plurality of command codes indicating instructions to the computer, arranged for performing the predetermined functions. Also, the computer system may be constituted of some of the components such as the microprocessor, the ROM, the RAM, the hard disk unit, the display unit, the keyboard, and the mouse, instead of all thereof.

(2) A part or whole of the components constituting the foregoing user interface device may be constituted of a single system LSI. The system LSI is an ultra-multifunctional LSI manufactured by stacking a plurality of components on a single chip, and is actually a computer system including a microprocessor, a ROM, a RAM and so forth. The RAM stores a computer program. By operation of the microprocessor in accordance with the computer program, the system LSI performs its functions.

Although the term of system LSI is adopted above, the device may be named as an IC, an LSI, a super LSI, or an ultra LSI, depending on the level of integration. Also, the integration may be achieved by an exclusive circuit or a general-use processor, instead of employing the LSI. After manufacturing the LSI, a field programmable gate array (FPGA), or a reconfigurable processor that accepts reconfiguration of connection or setting of circuit cells inside the LSI may be employed.

Further, in the case where an integration technique that can be substituted for the LSI is developed through advance of semiconductor technology or another technique deriving therefrom, naturally such new technique may be introduced for integrating the functional blocks. An example of such possibility is application of biochemical technology.

(3) A part or whole of the components constituting the foregoing user interface device may be constituted of an IC card or a single-piece module that can be removably attached to the user interface device. The IC card or the module is a computer system including a microprocessor, a ROM, a RAM, and so forth. The IC card or the module may include the ultra-multifunctional LSI referred to above. By operation of the microprocessor in accordance with the computer program, the IC card or the module performs its functions. The IC card or the module may be given tamper resistance.

(4) The present invention includes the input method described above. The present invention also includes a computer program that causes a computer to execute the input method, and digital signals representing the computer program.

Also, the present invention includes a computer-readable non-temporary recording medium such as a flexible disk, a hard disk, a CD-ROM, an MO, a DVD, a DVD-ROM, a DVD-RAM, a Blu-ray Disc (registered trademark) (BD), or a semiconductor memory, in which the computer program or the digital signal is stored. Further, the present invention includes the computer program or the digital signal stored in such recording media.

Also, the present invention includes transmission of the computer program or the digital signal through an electrical communication line, a wired or wireless communication line, a network typically exemplified by the internet, data broadcasting, and so forth.

Further, the present invention includes a computer system including a microprocessor and a memory, and the memory may store the foregoing computer program, and the microprocessor may be set to operate in accordance with the computer program.

Further, the program or the digital signal may be recorded in the recording medium and transferred, or transferred through the network and so on, thus to be executed by another independent computer system.

(5) The foregoing embodiment and variations may be combined in various manners.

The user interface device according to an aspect of the present invention can be advantageously employed for performing an input process on the basis of a user's degree of interest in a plurality of objects displayed on a screen. The user interface device is also applicable to evaluation of an effect of advertisement by means of a digital signage.

REFERENCE SIGNS LIST

10 User interface device
11 Gaze direction detection unit
12 Gaze duration calculation unit
13 Eye-attracting force calculation unit
14 Degree of interest estimation unit
20 Display unit
25 Display control unit
26 Screen
30 Camera
100 User interface system

The invention claimed is:

1. A user interface device configured to estimate a user's degree of interest in a plurality of objects displayed on a screen, for performing an input process on the basis of the user's degree of interest, the user interface device comprising:
   a gaze direction detection unit configured to detect a gaze direction of the user;
   a gaze duration calculation unit configured to calculate a gaze duration during which the gaze direction has remained on each of the plurality of objects;
   an eye-attracting force calculation unit configured to calculate an eye-attracting force of each of the plurality of objects, the eye-attracting force being a value indicating how strongly the object visually draws the user's attention; and
   a degree of interest estimation unit configured to estimate the user's degree of interest in each of the plurality of objects such that the longer the gaze duration is the higher the degree of interest becomes, and the smaller the eye-attracting force is the higher the degree of interest becomes.

2. The user interface device according to claim 1,
wherein the eye-attracting force calculation unit is configured to calculate the eye-attracting force of each of the objects on the basis of a physical feature of an image of the object.

3. The user interface device according to claim 2,
wherein the eye-attracting force calculation unit is configured to calculate the eye-attracting force of each of the objects on the basis of a degree of complexity of the image of the object, such that the higher the degree of complexity is the greater the eye-attracting force becomes.

4. The user interface device according to claim 2,
wherein the eye-attracting force calculation unit is configured to calculate the eye-attracting force of each of the objects on the basis of a degree of heterogeneity of the image of the object from images located around the object, such that the higher the degree of heterogeneity is the greater the eye-attracting force becomes.

5. The user interface device according to claim 1,
wherein the eye-attracting force calculation unit is configured to calculate the eye-attracting force of each of the objects such that the shorter the psychological distance between the object and the user is the greater the eye-attracting force becomes.

6. The user interface device according to claim 5,
wherein the eye-attracting force calculation unit is configured to calculate, for each of the objects, the psychological distance such that the greater the number of times that the user has so far viewed the object is the shorter the psychological distance becomes.

7. The user interface device according to claim 5,
wherein the eye-attracting force calculation unit is configured to calculate, for each of the objects, the psychological distance on the basis of whether the user is a producer of the object, such that the psychological distance becomes shorter in the case where the user is a producer of the object, than in the negative case.

8. The user interface device according to claim 5,
wherein the eye-attracting force calculation unit is configured to calculate, for each of the objects, the psychological distance on the basis of whether the user is a subject displayed in the object, such that the psychological distance becomes shorter in the case where the user is a subject displayed in the object, than in the negative case.

9. The user interface device according to claim 1,
wherein the eye-attracting force calculation unit is configured to calculate, for each of the objects, the psychological distance on the basis of a physical positional relationship between the user and the object.

10. The user interface device according to claim 9,
wherein the eye-attracting force calculation unit is configured to calculate the eye-attracting force of each of the objects on the basis of a distance between the user and the object, such that the shorter the physical distance is the greater the eye-attracting force becomes.

11. The user interface device according to claim 9,
wherein the eye-attracting force calculation unit is configured to calculate the eye-attracting force of each of the objects on the basis of an angle defined by a line connecting the user and the object and a normal of the screen, such that the smaller the angle is the greater the eye-attracting force becomes.

12. The user interface device according to claim 1,
wherein the degree of interest estimation unit is configured to compensate the gaze duration such that the greater the eye-attracting force is the shorter the gaze duration becomes, thus to calculate a compensated gaze duration, and to estimate the degree of interest such that the longer the compensated gaze duration is the higher the degree of interest becomes.

13. The user interface device according to claim 12,
wherein the degree of interest estimation unit is configured to calculate the compensated gaze duration by subtracting a time attributable to the eye-attracting force from the gaze duration.

14. The user interface device according to claim 12,
wherein the degree of interest estimation unit is configured to calculate the compensated gaze duration by dividing the gaze duration by a value attributable to the eye-attracting force.

15. The user interface device according to claim 1, further comprising:
a display control unit configured to control a display on the screen in accordance with the degree of interest estimated.

16. The user interface device according to claim 15,
wherein the display control unit is configured to cause the screen to display information on an object that has gained a highest estimated degree of interest among the plurality of objects.

17. The user interface device according to claim 15,
wherein the display control unit is configured to change a display mode of an object that has gained a highest estimated degree of interest among the plurality of objects, or the objects except for the object that has gained the highest estimated degree of interest among the plurality of objects.

18. The user interface device according to claim 1, constituted in a form of an integrated circuit.

19. The user interface device according to claim 1,
wherein the degree of interest estimation unit is configured to, when estimating the degree of interest such that the longer the gaze duration is the higher the degree of interest becomes, perform a compensation process according to the eye-attracting force and suppress a fluctuation in the degree of interest which fluctuates according to the eye-attracting force.

20. An input method to be performed by a computer for estimating a degree of interest of a user in a plurality of objects displayed on a screen, on the basis of the user's degree of interest, comprising:
detecting a gaze direction of the user;
calculating a time during which the gaze direction detected has remained on each of the plurality of objects, as gaze duration;
calculating an eye-attracting force for each of the objects, the eye-attracting force being a value indicating how strongly the object visually draws the user's attention; and
estimating the user's degree of interest in each of the plurality of objects, such that the longer the gaze duration is the higher the degree of interest becomes, and the smaller the eye-attracting force is the higher the degree of interest becomes.

21. A program recorded on a non-transitory computer-readable recording medium and causing a computer to execute the input method according to claim 20.

* * * * *